(12) United States Patent
Moriguchi et al.

(10) Patent No.: US 6,431,244 B1
(45) Date of Patent: Aug. 13, 2002

(54) LAMINATING APPARATUS AND SHEET CASSETTE

(75) Inventors: Masaru Moriguchi; Motohito Muraki, both of Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 70 days.

(21) Appl. No.: 09/664,052

(22) Filed: Sep. 18, 2000

(30) Foreign Application Priority Data

Sep. 16, 1999 (JP) .......................................... 11-262263

(51) Int. Cl.[7] .............................................. B32B 31/04
(52) U.S. Cl. ....................................... 156/555; 156/582
(58) Field of Search ................................ 156/552, 555, 156/580, 582, 583.1; 100/327, 160, 176

(56) References Cited

U.S. PATENT DOCUMENTS

| | | | | |
|---|---|---|---|---|
| 5,571,368 A | * | 11/1996 | Barge | 156/359 |
| 5,580,417 A | | 12/1996 | Bradshaw | 156/495 |
| 5,584,962 A | | 12/1996 | Bradshaw et al. | 156/495 |
| 5,639,339 A | * | 6/1997 | Couillard | 156/555 |
| 5,735,998 A | * | 4/1998 | Bradshaw | 156/495 |
| 5,853,531 A | * | 12/1998 | Murphy et al. | 156/555 |
| 5,888,342 A | * | 3/1999 | Reinders | 156/494 |
| 5,961,779 A | * | 10/1999 | Bradshaw | 156/495 |

FOREIGN PATENT DOCUMENTS

JP    10-507005    7/1998

\* cited by examiner

*Primary Examiner*—James Sells
(74) *Attorney, Agent, or Firm*—Oliff & Berridge, PLC (57) ABSTRACT

A laminating apparatus is provided in which the distance between a pair of paper feed rollers and a pair of pinch rollers is adjusted according to the size of the paper or item being laminated and the diameter of sheet rolls between which the paper or item is laminated. The adjustment is synchronized so that the paper sizes and sheet roll diameters are accounted for at once according to the insertion of a detachable housing providing a cassette accommodating different paper sizes. A depression portion on the housing permits the paper feed rollers to adjust to or from the pinch rollers when the selected housing is inserted to the laminating apparatus.

14 Claims, 13 Drawing Sheets

LAMINATING APPARATUS AND SHEET CASSETTE

CROSS-REFERENCE TO RELATED APPLICATIONS

This application contains subject matter that is related to co-pending U.S. patent application Ser. No. 09/664,051, filed Sep. 18, 2000. The two co-pending applications have common inventors and are commonly owned or assigned.

BACKGROUND OF THE INVENTION

1. Field of Invention

The invention relates to a laminating apparatus that covers and adheres front and back surfaces of a laminate target, such as paper, using sheets made of synthetic resin, and a structure of a sheet cassette to be mounted in the laminating apparatus.

2. Description of Related Art

There has been known a laminating apparatus for laminating targets, such as a card, by sheets of synthetic resin film.

National Stage Laid-Open Patent Publication (KOUHYOU) No. 10-507005 based on a PCT application discloses an example of the laminating apparatus described above. In the laminating apparatus, a pair of sheet rolls which are wound around each sheet thereof for laminating front and back surfaces of paper is rotatably supported at respective upper and a lower positions in a sheet cassette. The sheet cassette can be detachably mounted to a sheet supply unit of the laminating apparatus.

In the laminating apparatus, a pair of upper and lower pinch rollers are disposed at the paper feed-out side of the sheet cassette. Both pinch rollers are structured so as to rotate in synchronization with a turn of an external handle.

Paper put on a paper supply tray is fed to the gap between the upper and lower sheet rollers, and the paper is sandwiched therebetween and laminated while drawing the upper and lower sheets. A laminate thus formed is cut in an X direction (a direction perpendicular to a feed direction of the paper) using a lateral cutter blade. Accordingly, the paper laminated by sheets of a PET film (laminate) can be obtained.

However, in the conventional laminating apparatus, the paper, which is a laminate target, is manually inserted into a sheet laminating unit for laminating an upper and lower sheet in the sheet cassette after putting the paper on the paper feed tray. Therefore, there is a problem that it is burdensome to manually perform the inserting operation.

In response, applicant proposed a motor-driven laminating apparatus, as disclosed in Japanese Patent Application No. 10-369566. That is, a pair of paper feed rollers are disposed between a base end of the paper supply tray disposed at an inlet side in the laminating apparatus and an inlet side in the sheet cassette detachably mounted in the laminating apparatus (laminate target leading side). The paper feed rollers, the pinch rollers, and a pair of paper feed-out rollers are synchronized with each other and driven via an electric motor (not shown) and a power transmission mechanism, thereby automatically supplying paper P on the paper supply tray to the sheet laminating unit.

A minimum length (dimension along a feed direction of the laminate target) of paper (laminate target) that can be laminated is determined by a distance between the rollers. That is, when paper which is shorter in length than the distance between the rollers is put on the paper supply tray, a tip of the paper P does not reach the pinch rollers even though an end of the fed paper P is released from the paper feed rollers. Consequently, it is impossible to pinch the paper P by a pair of sheets.

It has been desired that one laminating apparatus could laminate different sized paper, such as A3, A4, and A6-size paper. Each width of the upper and lower sheets, which are to be accommodated in the sheet cassette, need to be changed to conform to each size. When the number of laminations of paper is set to the same number without concerning the size of the sheets, the roll length when the sheet for laminating a large size paper is rolled is long. By extension, the diameter of the roll is also large. Therefore, as to a dimension along the feed direction of the laminate target of the sheet cassette (hereinafter referred to as a depth), it is set large for the housing for large size paper and it is set small for the housing for small size paper.

In such a case, the sheet cassette has to be freely detachably disposed between the paper feed rollers and the pinch rollers. Therefore, the distance from the paper feed rollers to the pinch rollers (the distance between rollers) needs to be set longer in the structure than the paper feed rollers and the pinch rollers as fixedly disposed in the prior art which resulted in the problem that small size paper could not be laminated.

On the other hand, when the distance between rollers is set to be shorter, so that small size paper can be laminated, the diameters of the sheet rolls to be accommodated in the sheet cassette need to be small. In this case, problems arose that large size paper P could be laminated extremely few times, and required frequent replacement of the sheet cassette or the sheet rolls in the sheet cassette.

SUMMARY OF THE INVENTION

Therefore, the invention is made to solve the above-described problems. It is an object of the invention to provide a laminating apparatus which is capable of laminating different sized paper (laminate targets) and a sheet cassette which is capable of accommodating sheets having a large winding diameter and which is used in the laminating apparatus.

According to a first aspect of the invention, a laminating apparatus may include a laminate target supply unit that supplies a laminate target, a sheet supply unit that supplies a pair of sheets by which the laminate target is laminated, and a laminate processor that laminates the laminate target supplied from the laminate target supply unit with the pair of sheets supplied from the sheet supply unit while the laminate target is sandwiched between the pair of sheets and fed out as a laminated product. A cassette accommodating portion for detachably accommodating a sheet cassette which accommodates the pair of sheets wound in a roll shape thereof is formed in the sheet supply unit, and a paper feed roller means disposed between the laminate target supply unit and the cassette accommodating portion is provided so that the paper feed roller means can move closer to and apart from a laminate target leading side of the sheet cassette.

Therefore, when the sheet cassette for sheets having a small winding diameter is set in the same cassette accommodating portion as a replacement of the sheet cassette for sheets having a large winding diameter, the distance between the paper feed roller means and the pinch roller means can be shortened, so that a small laminate target can be also surely laminated and produced.

According to a second aspect of the invention, in the laminating apparatus of the first aspect of the invention, the laminating apparatus further may include an interlocking unit that moves the paper feed roller means closer to the laminate target leading side of the sheet cassette in synchronization with the setting operation of the sheet cassette into the cassette accommodating portion.

In the above laminating apparatus, in addition to the effect obtained by the first aspect of the invention, an effect that the laminating operation can be extremely speedily performed with ease is also produced.

According to a third aspect of the invention, in the laminating apparatus of the first or second aspect of the invention, a dimension of a feed direction of the laminate target in the cassette accommodating portion is formed to correspond to the sheet cassette in which sheets having a large winding diameter are accommodated, and the cassette accommodating portion is structured so that an attachment can be detachably mounted thereof and a sheet cassette in which sheets having a small winding diameter are accommodated is mounted apart from the laminate target supply unit on the attachment.

In the above laminating apparatus, the sheet cassette for the sheets having a small winding diameter can be easily mounted in the cassette accommodating portion, where the sheet cassette for the sheets having a large winding diameter can be mounted thereof, using the attachment. Therefore, in addition to the effects obtained by the first or second aspect of the invention, an effect that various sizes of the laminate targets can be easily laminated using one laminating apparatus is produced.

According to a fourth aspect of the invention, the sheet cassette may have sheets having a large winding diameter and can be mounted in the cassette accommodating portion of the laminating apparatus of the first aspect of the invention, wherein a depressed portion is formed toward the laminate target feed-out side on the laminate target leading side. With this structure, an effect is achieved such that the sheet cassette for the sheets having a large winding diameter can be mounted and used in the laminating apparatus so that the distance between the paper roller means and the pinch roller means can be adjusted. Further, the gap between the sheet rolls having a large winding diameter provided next to each other results in a space in which the depressed portion is provided, whereby the paper feed roller means can enter to accommodate the variable paper size adjustments.

BRIEF DESCRIPTION OF THE DRAWINGS

The invention is described in detail with the reference to the following drawings, wherein like numerals represent like elements, and wherein.

DETAILED DESCRIPTION OF PREFERRED EMBODIMENTS

Hereinafter, preferred embodiments of the invention will be described.

Figure 1:
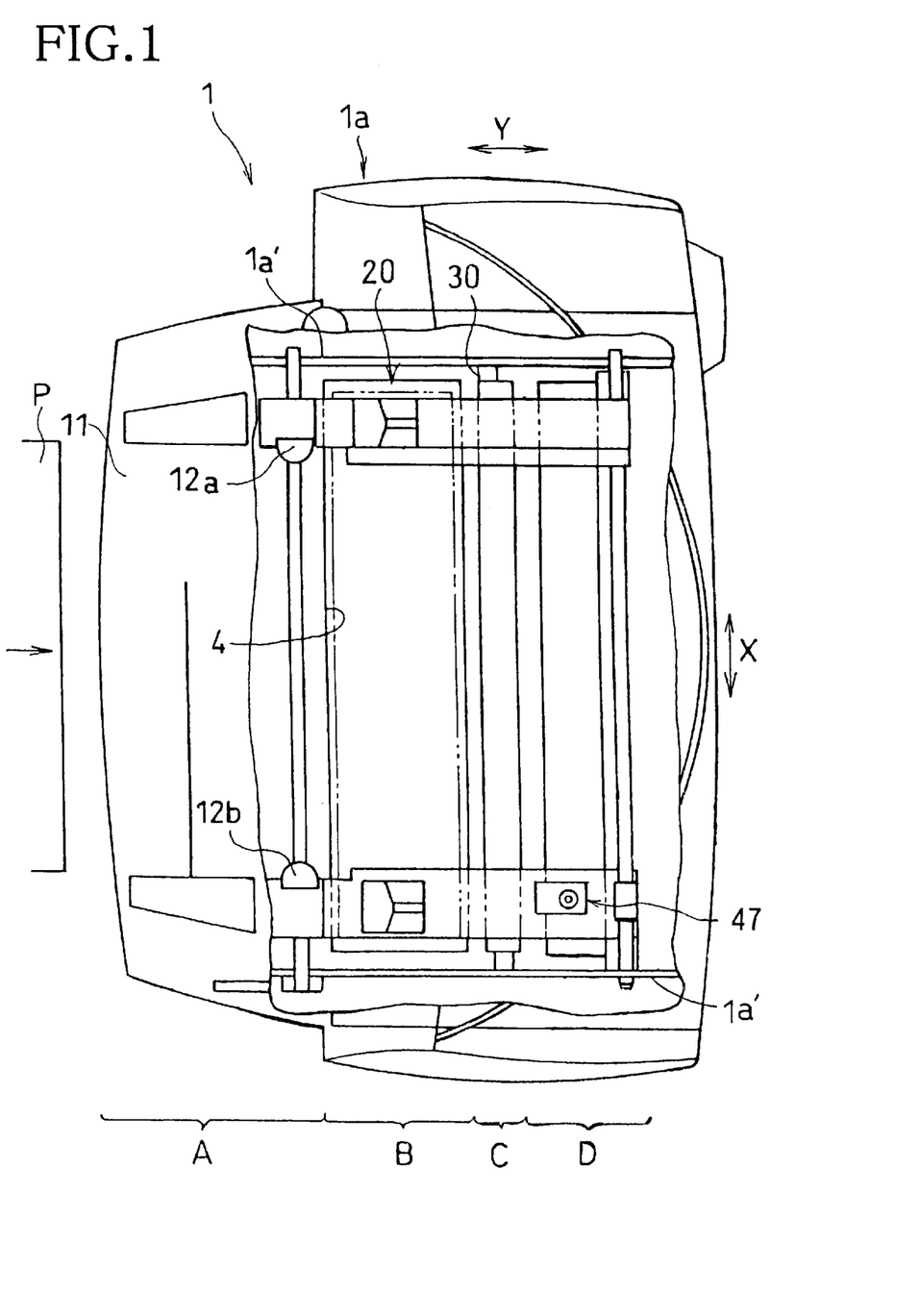
FIG. 1 is a schematic plan view of a laminating apparatus of an embodiment of the invention.
Figure 2:
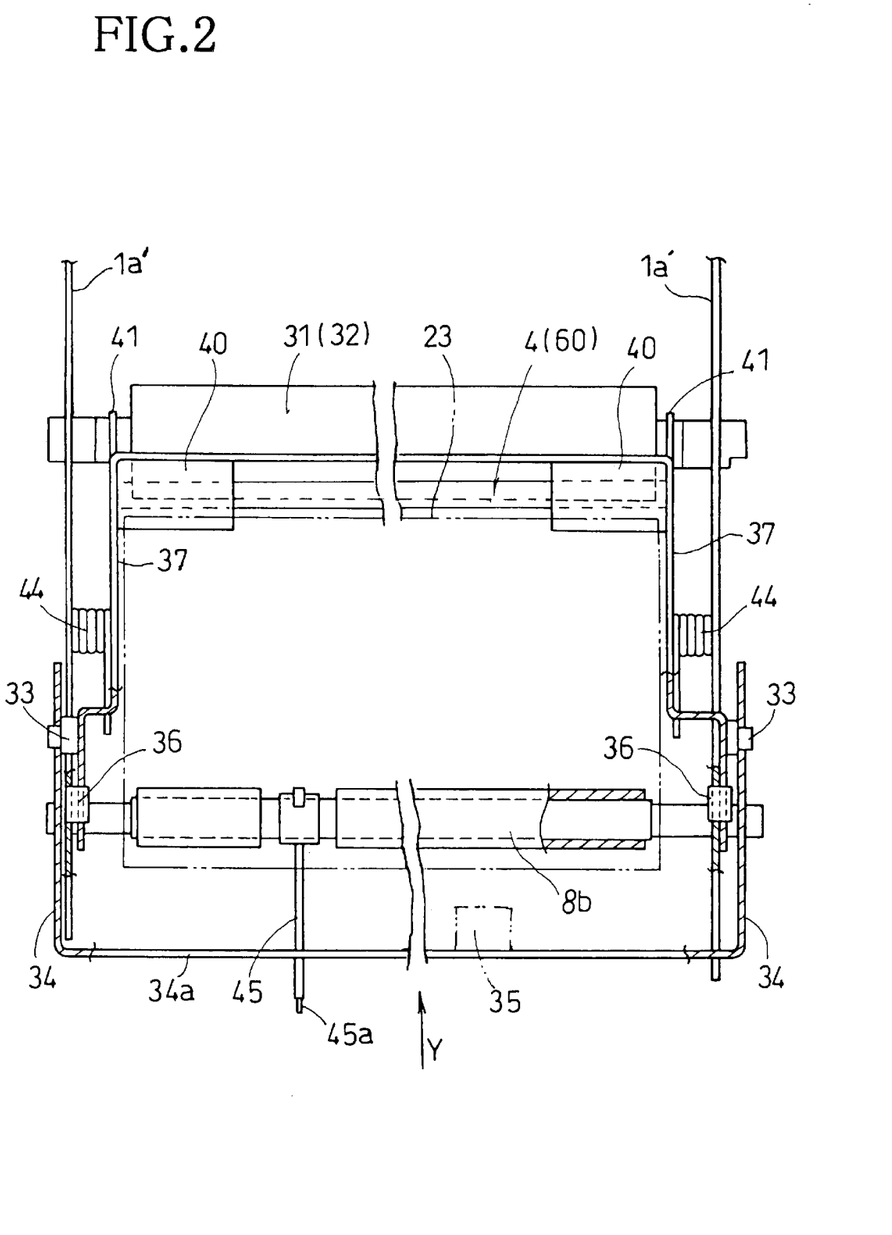
FIG. 2 is a partially cutaway plan view of essential parts of a cassette accommodating portion.
Figure 3:
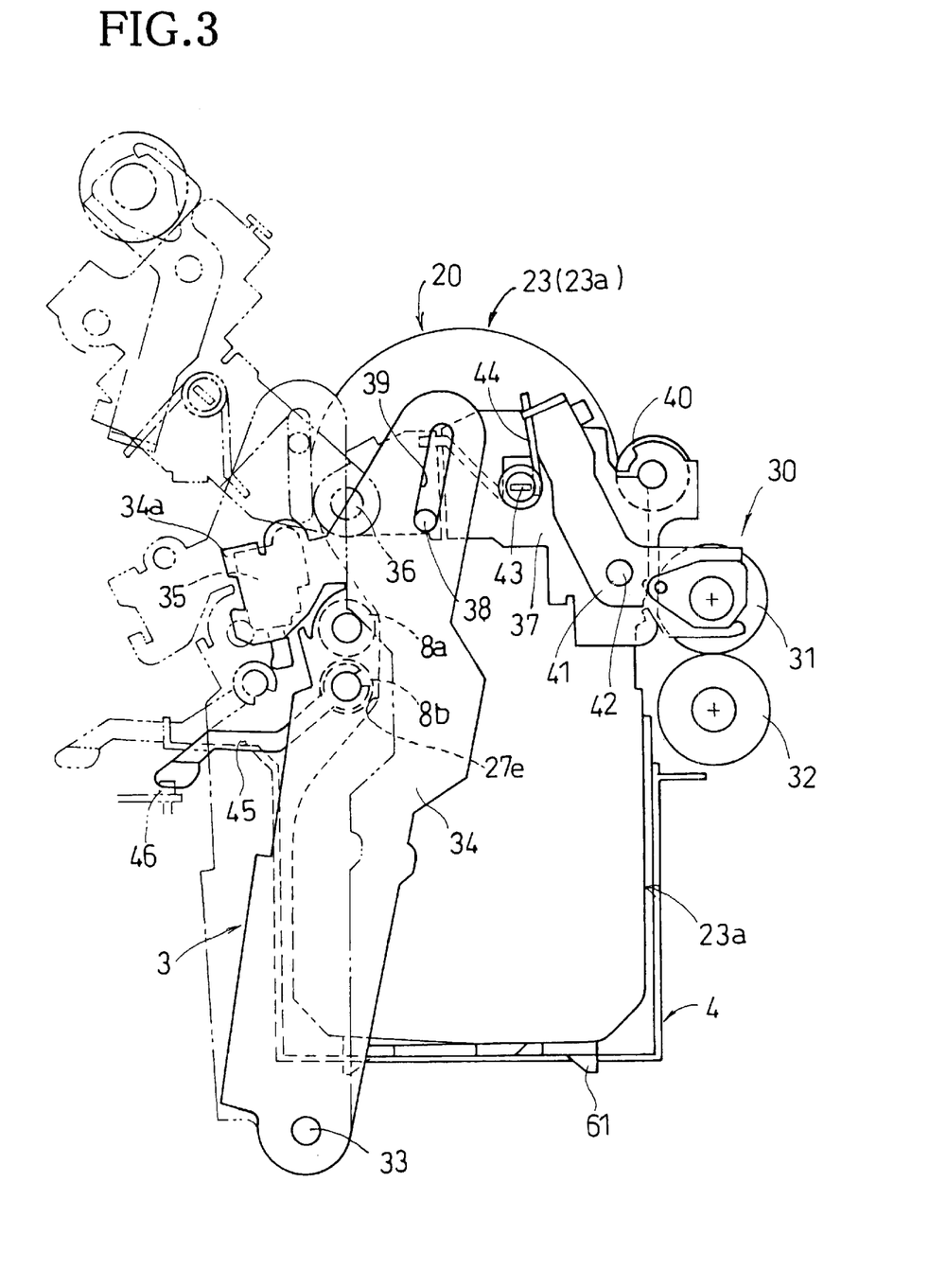
FIG. 3 is a side view of a swing mechanism.
Figure 4:
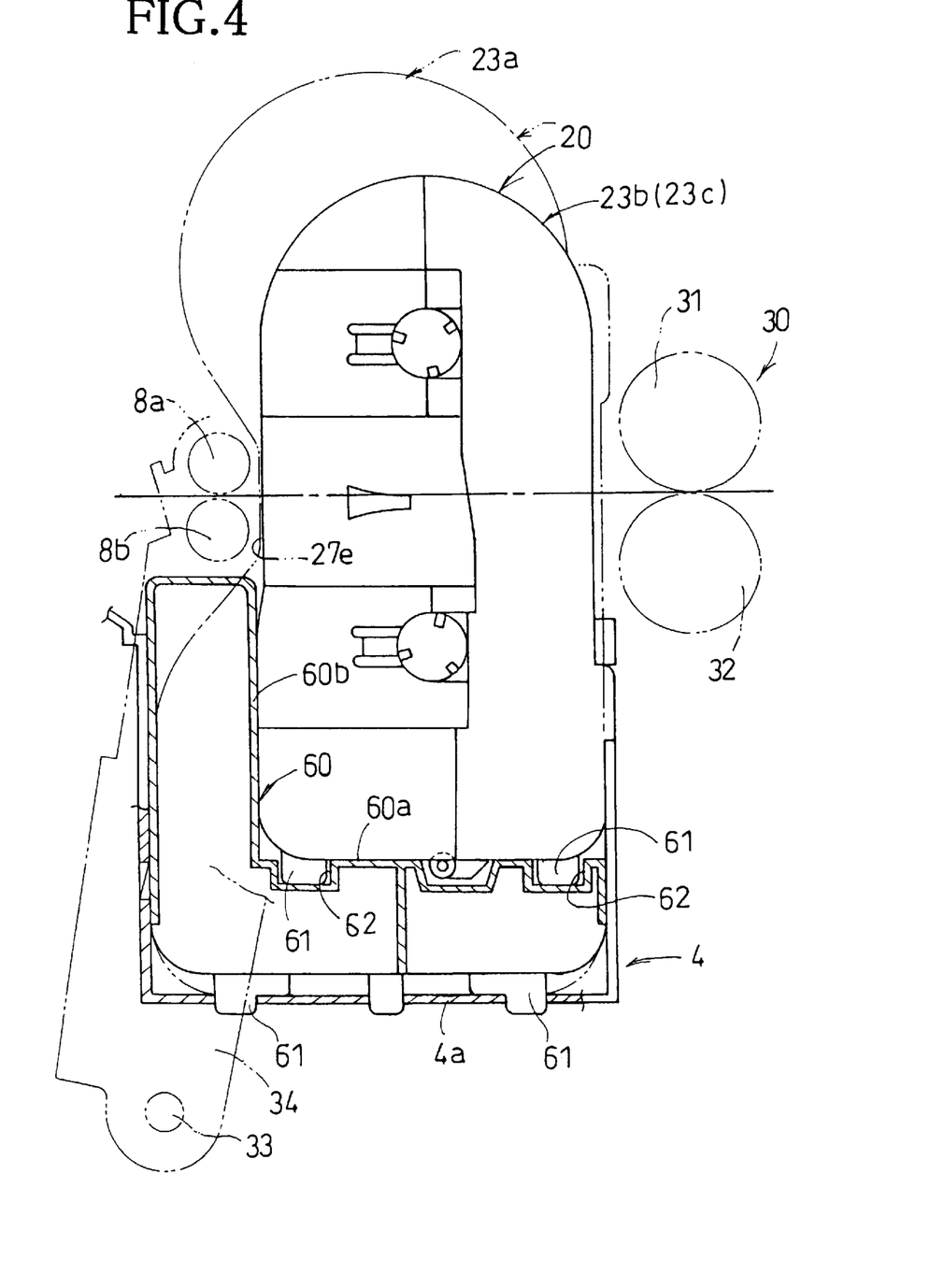
FIG. 4 is a side sectional view showing a state where a sheet cassette for small size paper is mounted in the cassette accommodating portion via an attachment.
Figure 5:
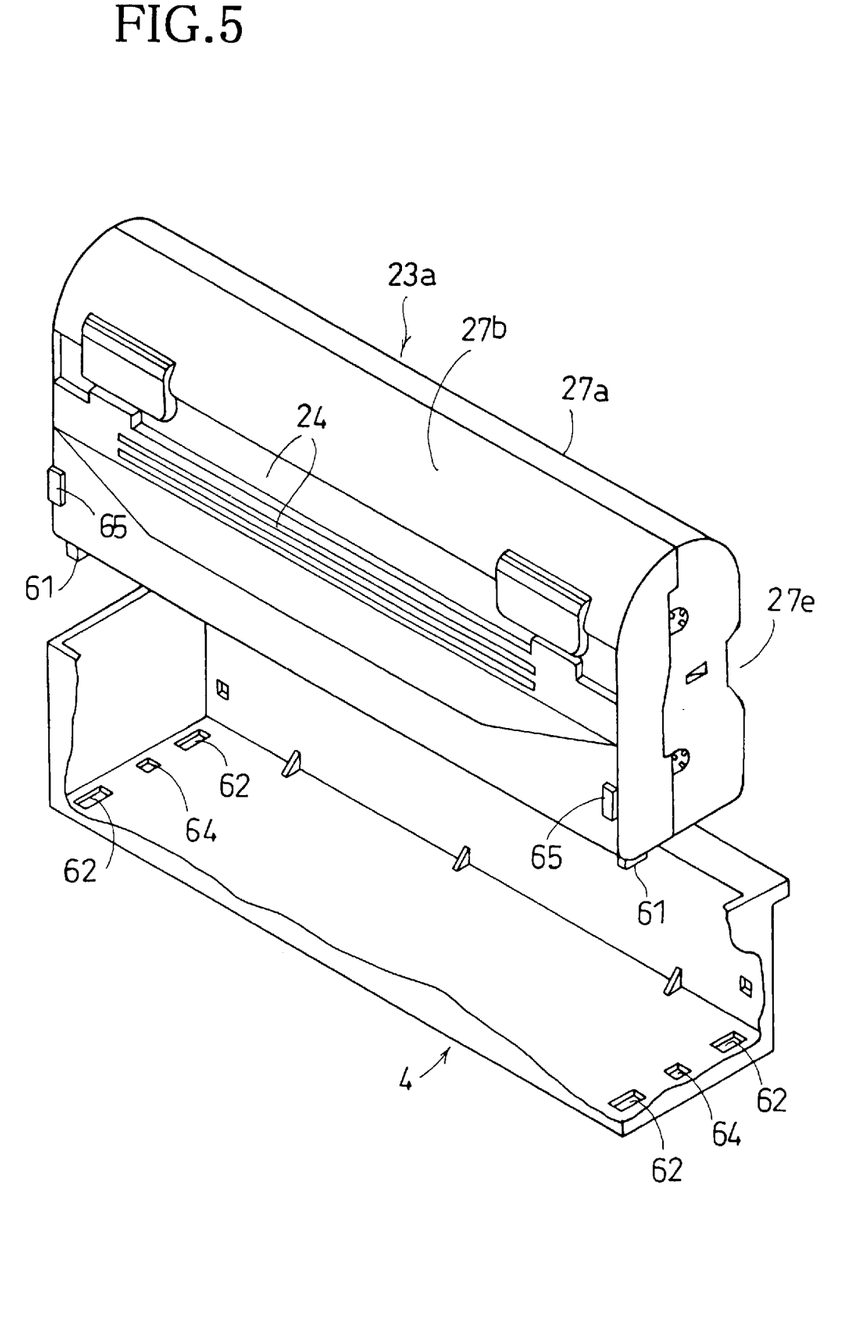
FIG. 5 is a partially cutaway perspective view of a housing of a sheet cassette for A3-size paper used in the laminating apparatus of the embodiment of the invention and the cassette accommodating portion.
Figure 7:
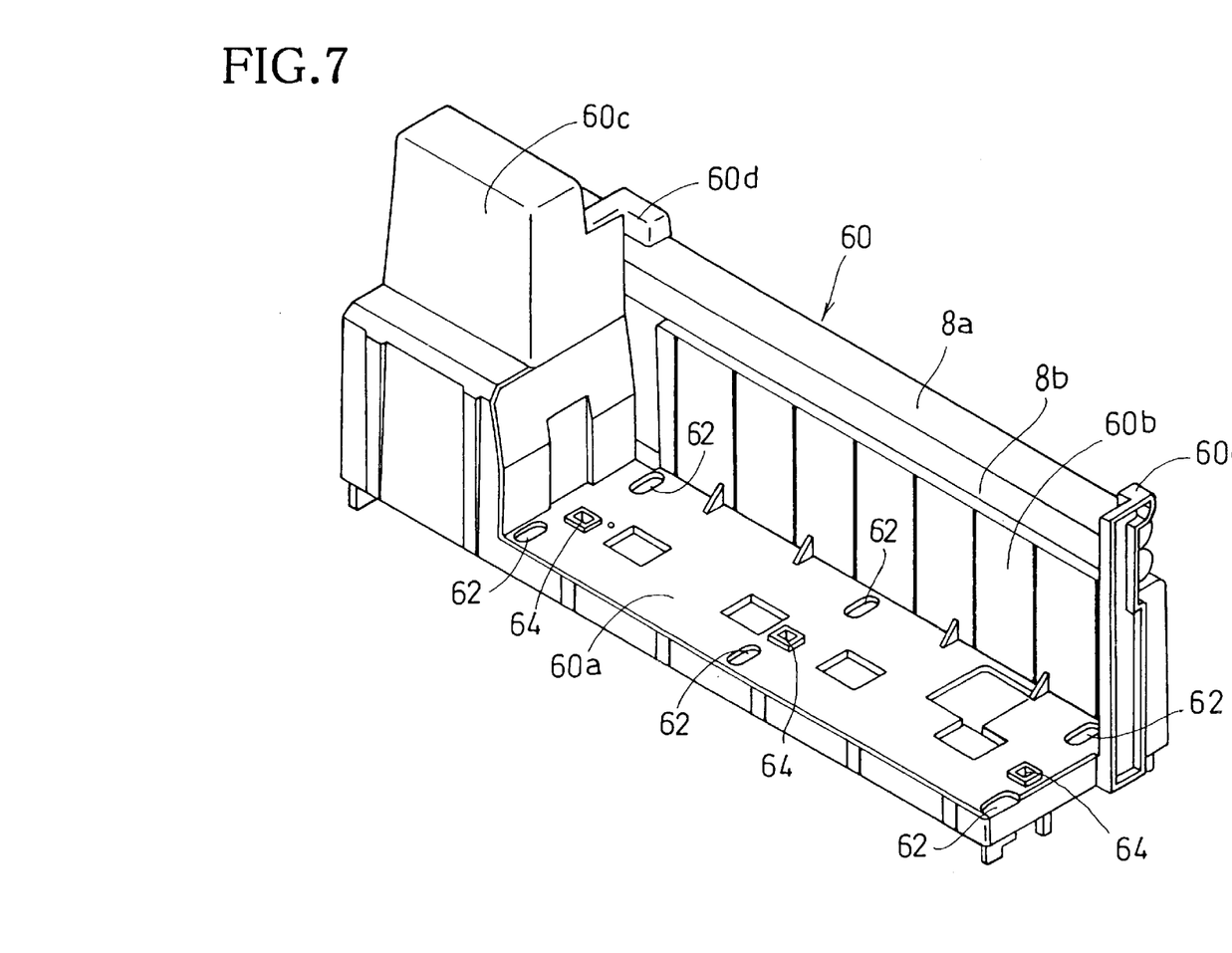
FIG. 7 is a perspective view of the attachment.

FIG. 1 is a schematic plan view of a laminating apparatus of an embodiment of the invention, FIG. 2 is a schematic plan view of a cassette accommodating portion, FIG. 3 is a side view of the cassette accommodating portion, FIG. 4 is a side sectional view showing a state where a sheet cassette mounted on an attachment is mounted in the cassette accommodating portion, FIG. 5 is a perspective view of the sheet cassette for laminating A3-size paper, and FIG. 7 is a perspective view of the attachment.

In FIGS. 1–5 and 7, the laminating apparatus 1 of this embodiment of the invention is covered by an outer housing 1a, and the inside of the laminating apparatus 1 comprises a paper supply unit A, a sheet supply unit B, a laminating processor C, and a cutting unit D, as shown in FIGS. 1 and 2.

Each structure basically functions such that the paper supply unit A serves paper P such as a document, a card, or the like, and the sheet supply unit B serves sheets S1, S2 by which the sheet P is laminated. The laminating processor C serves to laminate the paper P with the sheets S1, S2 while sandwiching the paper P between the sheets S1, S2. Further, the cutting unit D serves to cut the laminate R fed out from the laminating processor C, and has not only a function of cutting a laminate R in a Y direction shown in FIG. 1 using a first cutting mechanism (not shown) which is cutter means, but also a function of cutting the laminate R in an X direction shown in FIG. 1 using a second cutting mechanism 66 (see FIG. 6) of a longitudinal cutting mechanism 47.

As shown in FIG. 1, a paper supply tray 11 provided to the paper supply unit A, which is a laminate target supply unit, on the left upper side of the outer housing 1a, may be structured so that the paper supply tray 11 can be removed from the outer housing 1a or can fold when not in use.

The paper supply tray 11 has a paper mount face on which the paper P to be laminated is placed, and is provided with paper guides 12a, 12b for positioning the paper P in a width direction of the paper P. The paper guides 12a, 12b are supported by the paper supply tray 11 so that at least one of them is freely slidable in the X direction, and thus serves to adjust the distance between a wall face of the outer housing 1a and the paper guide to any value or width. In this embodiment, each sheet cassette 20 for each size paper is disposed so that the paper P is laminated with respect to the right side of the paper P (the right side when viewed from the paper feed-out side).

Between a base end of the paper supply tray 11 and the front side (a laminate target leading side) of the sheet cassette 20 which is freely detachably mounted on the cassette accommodating portion 4 having no upper surface in the sheet supply unit B, a pair of paper feed rollers 8a, 8b, which are paper feed roller means, are disposed so as to move closer to and apart from the laminate target (the paper P) leading side via a swing mechanism 3 which is an interlocking unit described later (see FIGS. 2 through 4).

Figure 6:
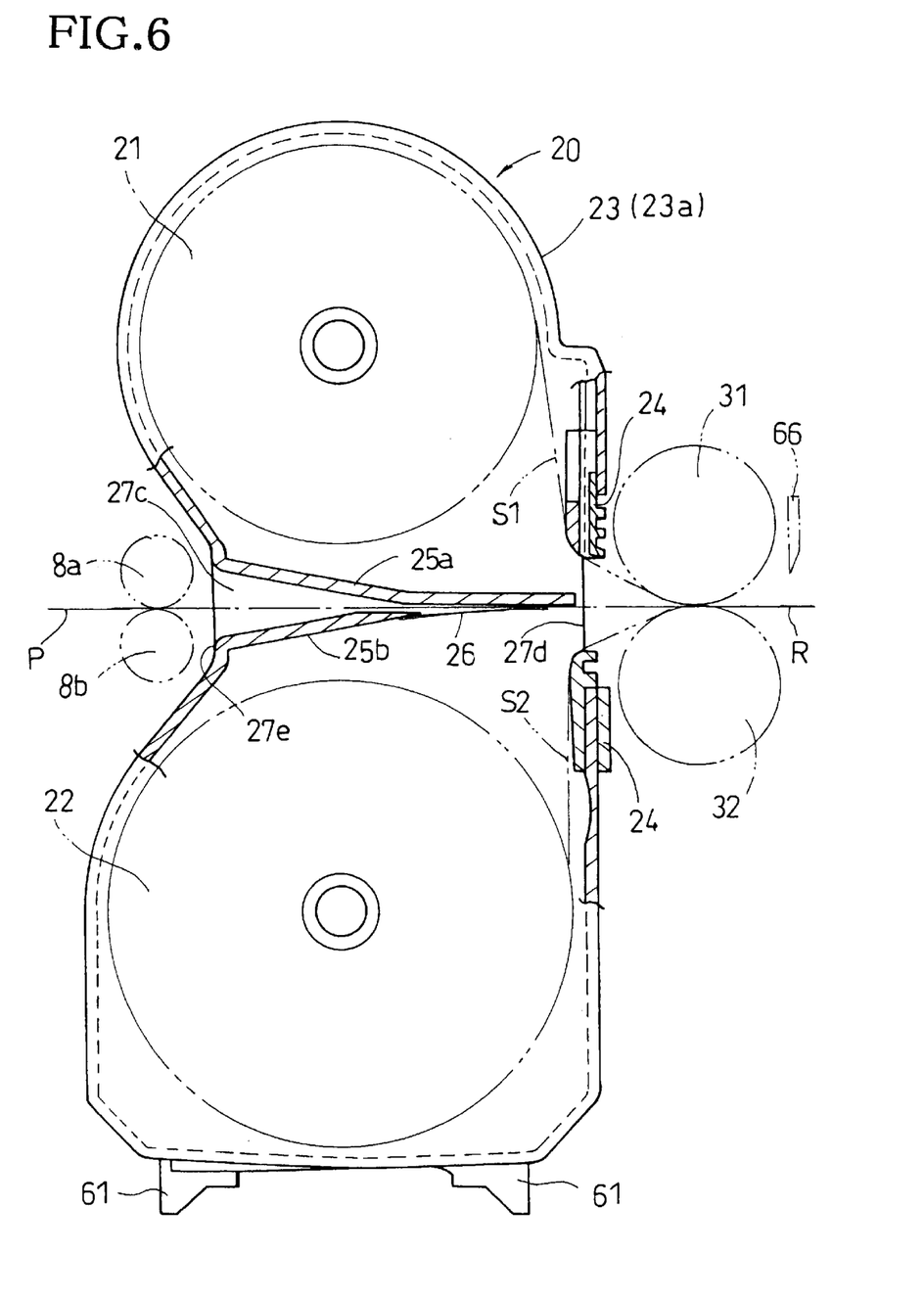
FIG. 6 is a side sectional view of the housing of the sheet cassette for A3-size paper.

The sheet cassette 20, which is freely detachably attached to the cassette accommodating portion 4 and an attachment 60, described later, are structured to contain two sheet rolls 21, 22 in a housing 23 as shown in FIG. 6.

Figure 10:
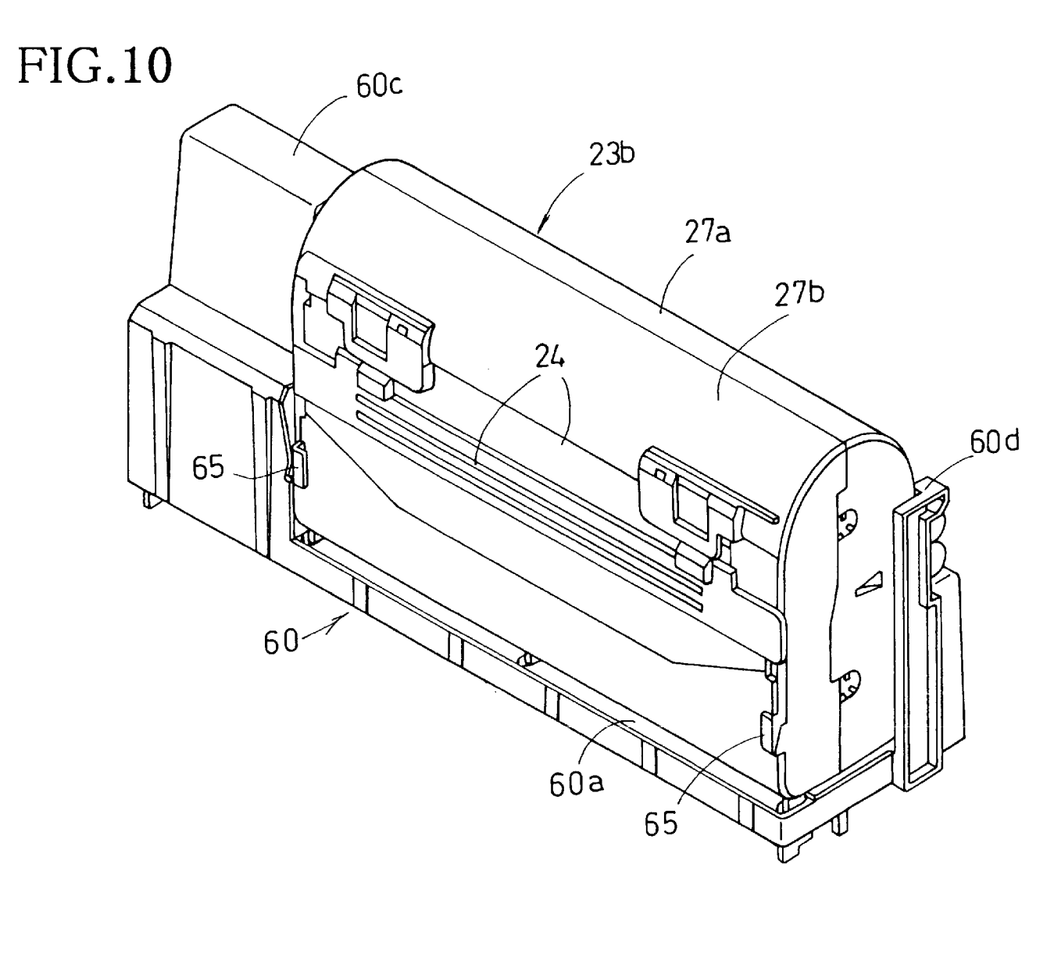
FIG. 10 is a perspective view showing a state where the sheet cassette for A4-size paper is mounted on the attachment.
Figure 11:
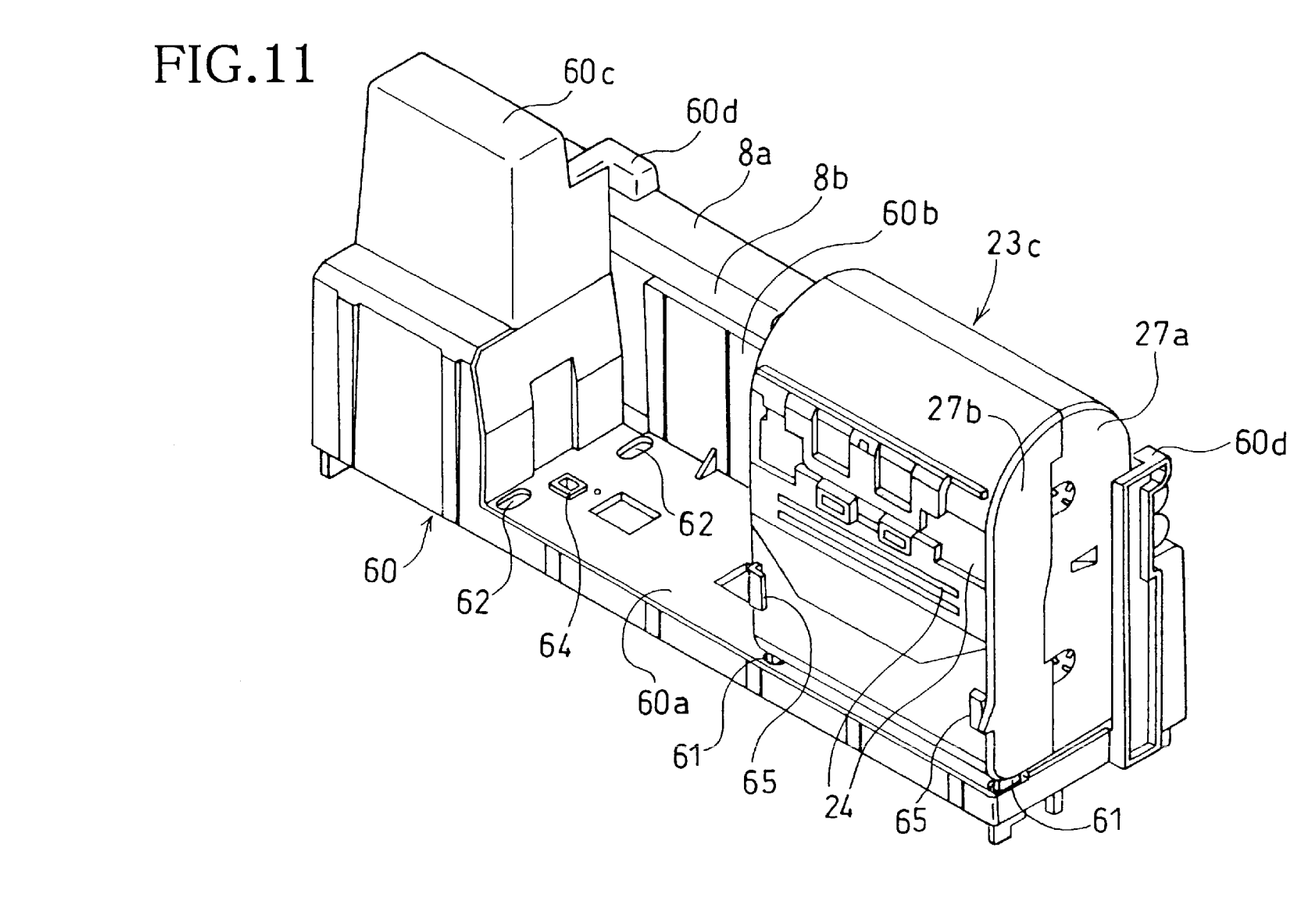
FIG. 11 is a perspective view showing a state where the sheet cassette for A6-size paper is mounted on the attachment.

The laminating apparatus 1 of the invention is structured to accommodate various detachably mounted sheet cassettes 20, each of which may have different sized housings 23 in which two sheet rolls 21, 22 having the width corresponding to different-sized paper such as A3, A4, or A6-size paper are accommodated, so that the laminating apparatus 1 can laminate at least three different sizes of paper. Hereinafter, a housing for A3-size paper is 23a (see FIGS. 5 and 6), a housing for A4-size paper is 23b (see FIGS. 8 and 10), and a housing for A6-size paper is 23c (see FIGS. 9 and 11).

The housing 23 used in this embodiment is formed by an injection molding method using a synthetic resin material, such as polypropylene resin, and comprises a pair of front and rear cases 27a, 27b. The end portions of the front and rear cases 27a, 27b are mutually engaged with each other and integrated with each other, thereby fabricating the housing 23.

An opening at the front side (an upstream of feed direction of the paper and the laminate target leading side) serves as a paper insertion port 27c, and an opening at the back side (downstream in the feed direction of the paper and laminate target feed-out side) serves as a paper feed-out port 27d.

The paper insertion port 27c has a function of feeding the paper P into the gap between the sheet rolls 21, 22. The paper feed-out port 27d has a function of feeding out the paper P fed through the paper insertion port 27c to the laminating processor C together with the sheets S1, S2 fed out from the sheet rolls 21, 22, respectively. The paper feed-out port 27d is provided with a pair of upper and lower shutters 24 for opening/closing the paper feed-out port 27d.

A pair of upper and lower guide plates 25a, 25b are provided in the housing 23 that extend from the paper insertion port 27c to the paper feed-out port 27d. The guide plates 25a, 25b form a guide path for guiding the paper P fed from the paper insertion port 27c to the paper feed-out port 27d. In this embodiment, the guide plates 25a, 25b are different in length, and the lower guide plate 25b is shorter while the upper guide plate 25a is longer. The lower guide plate 25b is provided with a resin spring 26 for pressing the paper P being fed against the upper guide plate 25a to position the paper P. Accordingly, the paper P fed from the paper insertion port 27c is surely guided to the paper feed-out port 27d by the guide plates 25a, 25c and the resin spring 26.

As shown in FIGS. 4, 7, 10, and 11, the attachment 60 has the same shape in a plan as the shape of the housing 23a for A3-size paper snugly fit in the cassette accommodating portion 4 which has no upper surface, and is structured so that the small housing 23b for A4-size paper and the housing 23c for A6-size paper can be mounted at each predetermined position. Particularly, the attachment 60 is formed in a substantially L-shape in side cross section by a bottom plate 60a, on which the housing 23 is mounted, and a wall plate 60b that stands from one side of the bottom plate 60a (the upstream of the feed direction of the paper P in this embodiment), and is integrally formed by an injection molding method using a synthetic resin material so that the block portion 60c for positioning the attachment 60 protrudes upwardly from one end of a longitudinal direction of the bottom plate 60a and the wall plate 60b (the right edge of the paper P in this embodiment). The wall plate 60b and the block portion 60c are provided with support portions 60d, 60d for preventing the housing 23 set on the attachment 60 from falling down to the upstream side of the feed direction of the paper P. Further, a plurality of guide recesses 62 and positioning protrusions 63 are each located at predetermined positions.

Figure 8:
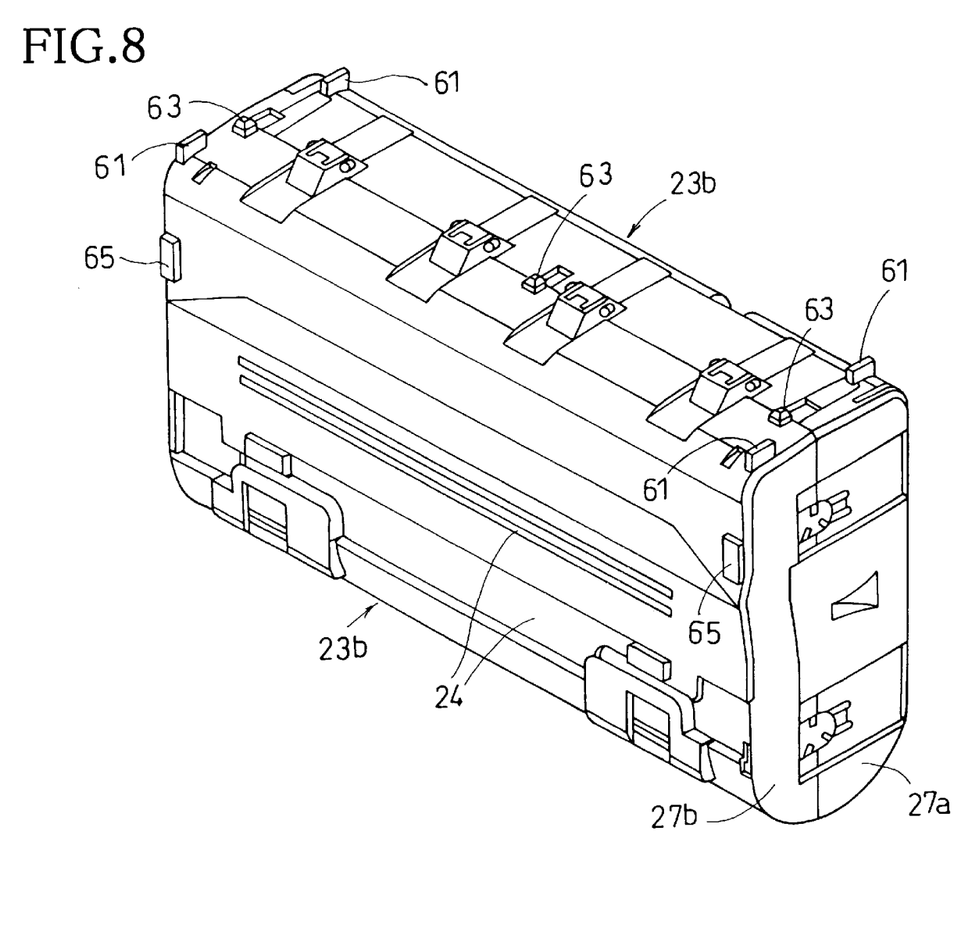
FIG. 8 is a perspective view of a housing of a sheet cassette for A4-size paper when viewed from the bottom.
Figure 9:
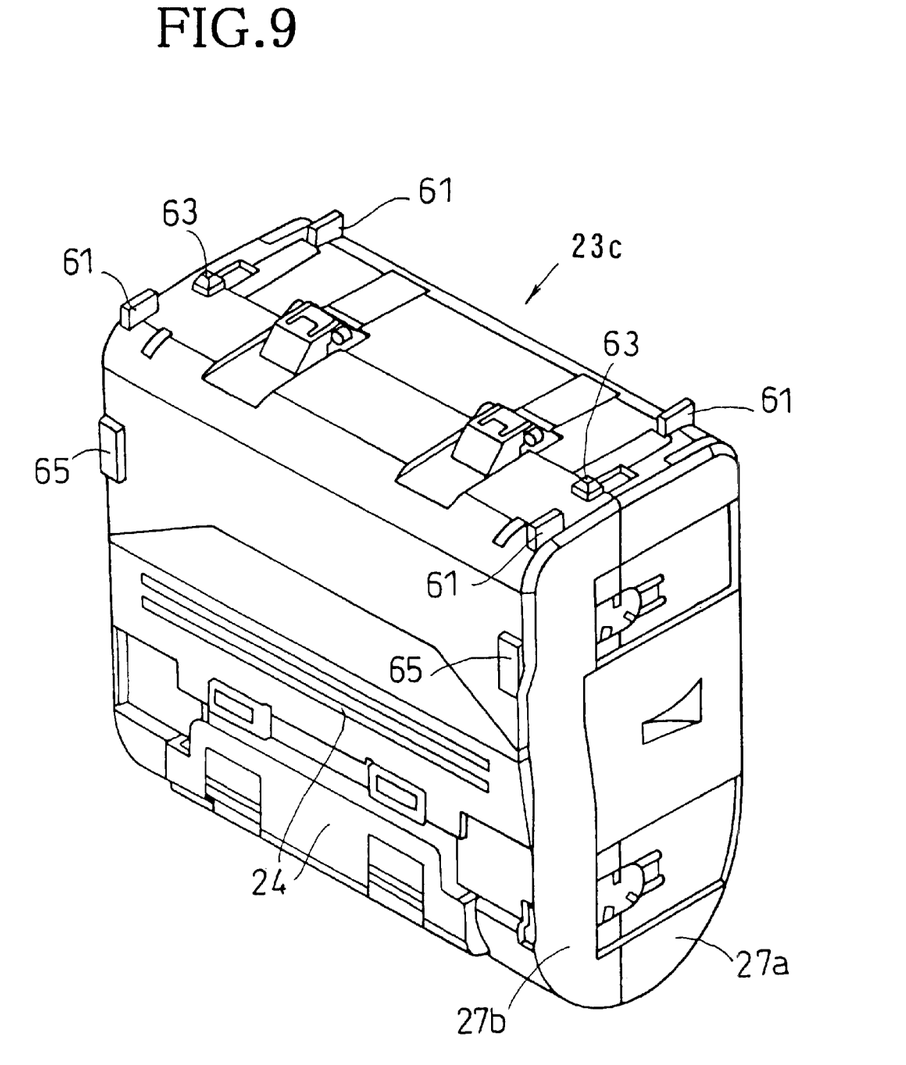
FIG. 9 is a perspective view of a housing of a sheet cassette for A6-size paper when viewed from the bottom.

When the housing 23 is set in the cassette accommodating portion 4 or the attachment 60, guide protrusions 61 that protrude from right and left ends of the bottom surface of the housing 23 fit into the guide recesses 62 which are perforated or recessed in the bottom of the cassette accommodating portion 4 and the attachment 60. Further, truncated pyramid positioning protrusions 63 that protrude from the bottom of the housing 23 fit into the positioning recesses 64 which are perforated or recessed in the bottom of the cassette accommodating portion 4 or the attachment 60. (See FIGS. 4 through 10. FIGS. 8 and 9 shows the sheet cassettes in perspective views so that the housings 23b, 23c can be seen.)

It has been desired that the laminating apparatus could laminate, for example, A3, A4, and A6-size paper. Each width of the upper and lower sheets S1, S2, which are accommodated in the housing 23 of the sheet cassette 20, therefore needs to be changed with respect to the paper size. When the number of laminations of paper are set to the same number without concern for the size of the paper, the roll length when the sheets S1, S2 for laminating a large size paper are rolled is long, and therefore by extension, the diameters of the rolls are large. Thus, the dimension along the feed direction of the laminate target of the housing 23 of the sheet cassette 20 (hereinafter referred to as a depth) is set large for the housing for large size paper and is set small for the housing for small size paper. The sheet cassette 20 needs to be detachably disposed between the pair of paper feed rollers 8a, 8b and a pair of pinch rollers 31, 32.

In the prior art, therefore, the distance between the pair of paper feed rollers and the pair of pinch rollers was long as each pair of rollers were fixedly disposed. Consequently, small size paper could not be laminated. On the other hand, when the distance between each pair of rollers is set shorter so that small size paper can be laminated, the diameters of the sheet rolls 21, 22 accommodated in the sheet cassette 20 must be small. This results in large size paper P being laminated extremely few times, and requires frequent replacement of the sheet cassette 20 or the sheet rolls 21, 22 in the sheet cassette 20.

Therefore, the invention provides in the housing 23 for laminating A3-size paper P, that the dimension in the feed direction of the paper P (the depth) is large. On the other hand, as shown in FIGS. 3 through 6, in the front case 27a, a depressed portion 27e, where the portion of the paper insertion port 27c is depressed toward the paper feed-out port 27d, is formed. In a state where the sheet cassette 20 is set, as described later, the paper feed rollers 8a, 8b are entered within the depressed portion 27e via the swing mechanism 3 to accommodate lamination of large-size paper. On the other hand, in a state where the sheet cassette 20 for small size paper (A4 or A6) is set, the paper feed rollers 8a, 8b are moved closer to the paper insertion port 27c so that the distance between rollers becomes shorter. The sheet cassette 20 is structured so as to be detachably mounted in the same laminating apparatus even when each sheet cassette 20 has different dimensions for different sized paper.

Further, when the housing 23b for A4-size paper or the housing 23c for A6-size paper is set on the attachment 60, so that the one end surface of the housing contacts the block portion 60c of the attachment 60 (see FIGS. 10 and 11), the sheets S1, S2 are fed out so that the right edge of the paper P to be fed becomes a reference side of the laminating operation.

In the set state described above, the size of the paper P which can be laminated can be displayed on a display unit (not shown), such as a liquid crystal panel provided on the laminating apparatus 1, by detecting detected portions 65, 65 which project from both ends of the side surface of the one longitudinal direction of the housings 23a, 23b, 23c, using a sensor (not shown), such as a limit sensor, which is disposed at a predetermined position in the laminating apparatus 1.

The sheet rolls 21, 22 are the same as the prior art in that the sheet rolls 21, 22 are formed by winding elongated sheets in a roll shape. However, the material of the sheets is greatly different from the prior art. That is, as shown in FIG. 6, the sheet S1 rolled as the sheet roll 21 includes a transparent resin film layer as a base and an adhesive layer laminated on one surface of the base. PET (polyethylenetelephthalate) is practically used as the film layer serving as the base of the sheet S1. The sheet S2 rolled as the sheet roll 22 which is disposed at the lower portion is formed of a separation type sheet, and more specifically it is a separation type sheet. That is, the sheet S2 has paper as a base, and a material having separativeness, such as paraffin or the like, is impregnated into or laminated on the base. The sheet S1 has such an adhesiveness property that the adhesive layer of the sheet S1 is easily peeled off. The sheet S2 is not limited to the separation type sheet having paper as a base, and it may be a sheet using resin having separativeness as a base, The sheet rolls 21, 22 are rotatably supported in the housing 23.

The sheets S1, S2 are drawn out from the paper feed-out port 27d of the housing 23 so that the adhesive surface and the separation face confront each other.

The sheet cassette 20 is freely detachably mounted to the cassette accommodating portion 4 in the laminating apparatus 1, or to the attachment 60 which is freely detachably mounted to the cassette accommodating portion 4. In a state where the large housing 23a for A3-size paper is placed on a bottom plate 4a of the cassette accommodating portion 4 or in a state where the housing 23b for A4-size paper or the housing 23c for A6-size paper is placed on the bottom plate 60a of the attachment 60, the paper insertion port 27c is located on an extension line of the feed path (supply path) of the paper P, that is, on a straight line connecting a pinching area of the paper P of the paper feed rollers 8a, 8b and a pinching area of the pinch rollers 31, 32, so that the paper P supplied from the paper supply tray 11 is smoothly fed into the sheet cassette 20 (see FIG. 4).

In a state where the sheet cassette 20 is not mounted in the cassette accommodating portion 4, the shutter 24 covers the paper feed-out port 27d. In a state where the sheet cassette 4 is mounted in the cassette accommodating portion 4, the shutter 24 is evacuated from the paper feed-out port 27d, so that the paper P can be fed out to the laminating processor C.

As shown in FIGS. 2, 3, 4, and 6, the laminating processor C is provided with pinch roller means 30 that includes the upper and lower rollers 31, 32. The pinch roller means 30 is supported so that the pinch position thereof faces the paper feed-out port 27d of the sheet cassette 20 mounted in the cassette accommodating portion 4.

The lower roller 32 rotatably supported by right and left chassis 1a' is a driving roller rotated by driving means, such as a motor (not shown). On the other hand, the upper roller 31 is a driven roller which is idled, and is rotated in contact with the lower driving roller 32. In the laminating apparatus 1 of the invention, the upper driven roller 31 is structured to contact/release from the lower roller 32 in unison with the movement of the swing mechanism 3 of the paper feed roller 8a, 8b, as shown in FIG. 3.

Next, a structure of the swing mechanism 3 will be described with reference to FIGS. 2 and 3.

The paper feed rollers 8a, 8b are axially fixed on a pair of right and left main swing arms 34, 34 pivotally supported by lower pivot pins 33 mounted on the lower portion of the right and left of chassis 1a', 1a'. A paper sensor 35 for detecting the tip of the paper P to be fed is mounted to a connection plate 34a that connects both main swing arms 34, 34. Further, guide pins 38, 38 that laterally project from a pair of right and left cassette holding support arms 37, 37 whose ends are pivotally supported by upper pivot pins 36 mounted on upper portions of the right and left chassis 1a, 1a slidably engage into slits 39, which elongate in the vertical direction and are perforated in upper sides of the right and left main swing arms 34, 34. A press roller 40, for pressing the upper portion of the paper feed out of the housing 23 of the sheet cassette 20 that is inserted into the cassette accommodating portion 4 from above, is rotatably mounted to the front ends of the cassette holding support arms 37, 37.

Further, both ends of the upper rollers 31 are rotatably supported by a pair of roller arms 41, 41 rotatably supported by a pin 47 provided at the front ends of the right and left cassette holding support arms 37, 37. One end of each torsion spring 44 supported by a projecting piece 43, which is formed by cutting and bending, is caught by the cassette holding support arm 37, and other end of each torsion spring 44 is joined together so as to urge the roller arms 41 downward.

The housing 23a for A3-size paper is directly set in the cassette accommodating portion 4. The housing 23b for A4-size paper or the housing 23c for A6-size paper is either set in advance into attachment 60 which is then set in the cassette accommodating portion 4, or the housing 23b or 23c is set on the attachment 60 after the attachment 60 is set in the cassette accommodating portion 4. After that, an operator holds the front end of the cassette holding support arm 37 and rotates it to the paper feed-out side which is the upper portion of the housing 23 so that the housing 23 is pressed so as not to be lifted up by the press roller 40. The pair of the right and left cassette holding support arms 37, 37 are engaged with an engagement portion (not shown) of the chassis 1a' or the outer housing 1a while keeping the posture of the cassette holding support arms 37, 37. At this time, the upper roller 31 mounted on the roller arms 41, 41 is urged against the lower roller 32 by an urging force from the torsion springs 44 (see a state of a portion indicated with a solid line in FIG. 3).

Further, when the housing 23 is set under the pressure, the right and left main swing arms 34, 34 are swung in the right direction in FIG. 3 and the upper and lower paper feed rollers 8a, 8b as paper feeding means mounted to the main swing arms 34, 34 move closer to the paper insertion port 27c, which is the laminate target leading side of the sheet cassette 20, by a sliding connection relationship of the cassette holding support arms 37, 37 and the slits 39. This state is detected by a sensor 46, such as a limit switch, which is provided to the laminating apparatus 1 and is touched by a tip 45a of a detecting arm 45 extending from the lower paper feed roller 8b to the upstream of the paper feed direction, and this state is communicated to an operator via the display unit.

On the other hand, when the right and left cassette holding support arms 37, 37 are swung in the upper left direction in FIG. 3 so that the housing 23 becomes free from the pressure, the upper roller 31 mounted on the roller arms 41, 41 at its front ends is released from the lower roller 32, the main swing arms 34, 34 are also swung in the left direction. The upper and lower paper feed rollers 8a, 8b, as the paper feed means, move away from the paper insertion port 27c, which is the laminate target leading side of the sheet cassette 20 (see a state of a portion indicated with a double dashed chain line).

The pinch roller means 30 described above functions to pinch the paper P fed into the gap between the sheets S1, S2, which are supplied from the sheet cassette 20 mounted in the sheet supply unit B, while joining the sheets S1,S2. The paper P pinched between the sheets S1, S2 is fed out while pinched by the pinch roller means 30, whereby the paper P is laminated by the sheets S1, S2 to thereby obtain a laminated member R.

The cutting unit D is provided with a first cutting mechanism (not shown) for cutting the laminate R fed out from the laminating processor C in the Y direction (cutting in the direction parallel to the feed direction of the laminate R), and a cutter blade 66 (see FIG. 6) that is a second cutting mechanism for cutting the laminate R in the X direction, which is perpendicular to the feed-out direction of the laminate R, as the cutter means.

A spiral groove is formed at the center of a circular plate type cutter blade of the lateral cutting mechanism. Further, a spiral shaft extending in the lateral direction (not shown) is provided to the chassis 1a', and the spiral shaft is engaged with the spiral groove of the cutter blade. The spiral shaft is rotatably mounted on the chassis 1a', and is connected to a motor (not shown). By rotating the motor, the spiral shaft is rotated and the cutter blade engaged with the spiral shaft is moved in the X direction to cut the laminate R in the lateral direction.

The cutter blade 66 of the longitudinal cutting mechanism 47 serves to cut out the side edge portion (salvage) of the laminate R when the width of the sheets S1, S2 is excessively larger than the paper P.

A laminating operation in the above-described structure will be described. First, either the sheet cassette 20 for A3-size paper is directly set in the cassette accommodating portion 4, or the attachment 60, in which the small sheet cassette 20 for A4 or A6-size paper is set in advance, is set in the cassette accommodating portion 4.

When the sheet cassette 20 is mounted, the tip portions of the sheets S1, S2 of the sheet cassette 20 are mutually adhesively attached to each other in advance. Then, in this state, the cassette holding support arm 37 is swung in the upward direction of the housing 23, the housing 23 is pressed by the pressing roller 40, and the tip portions of the sheets S1, S2 are pinched by the pinch rollers 31, 32. At this time, the distance between the paper feed rollers 8a, 8b and the pinch rollers 31, 32 can be shortened because the main swing arms 34, 34 are rotated and moved closer to the front side of the housing 23, and the upper and lower paper feed rollers 8a, 8B, which are the paper feeding means, are moved closer to the front surface of the housing 23.

When the standby work as described above is completed, the paper P to be laminated is put on the paper supply tray 11. Here, at least the width of the sheets S1, S2 are larger than the width of the paper P. When the paper P is fed between the paper feed rollers 8a, 8b along the paper guide plate 12a, 12b, the paper P is inserted into the sheet cassette 20 from the paper insertion port 27c of the sheet cassette 20 mounted in the sheet supply unit B, sandwiched between the sheets S1 and S2 and fed out from the paper feed-out port 27d to the laminating processor C while guided by the paper guide plates 25a, 25b and the resin spring 26. The paper P which is fed out together with the sheets S1, S2 is pinched by the pinch roller means 30 to laminate the paper P with the sheets S1, S2.

In the laminating apparatus 1 of the embodiment, the sheet S1 has the transparent resin film layer F as the base, the adhesive layer T is laminated on one surface thereof. When the sheet S2 is the separation type sheet layer, the sheet S1 including the film layer F and the adhesive layer T is pressed against the surface of the paper P. The film layer F is adhered to the surface of the paper P by the adhesive layer T. On the other hand, the sheet S2 is pressed against the back surface of the paper P, however, the sheet S2 does not adhere to the paper P because the sheet S2 has only the separation type sheet layer.

Figure 12A:
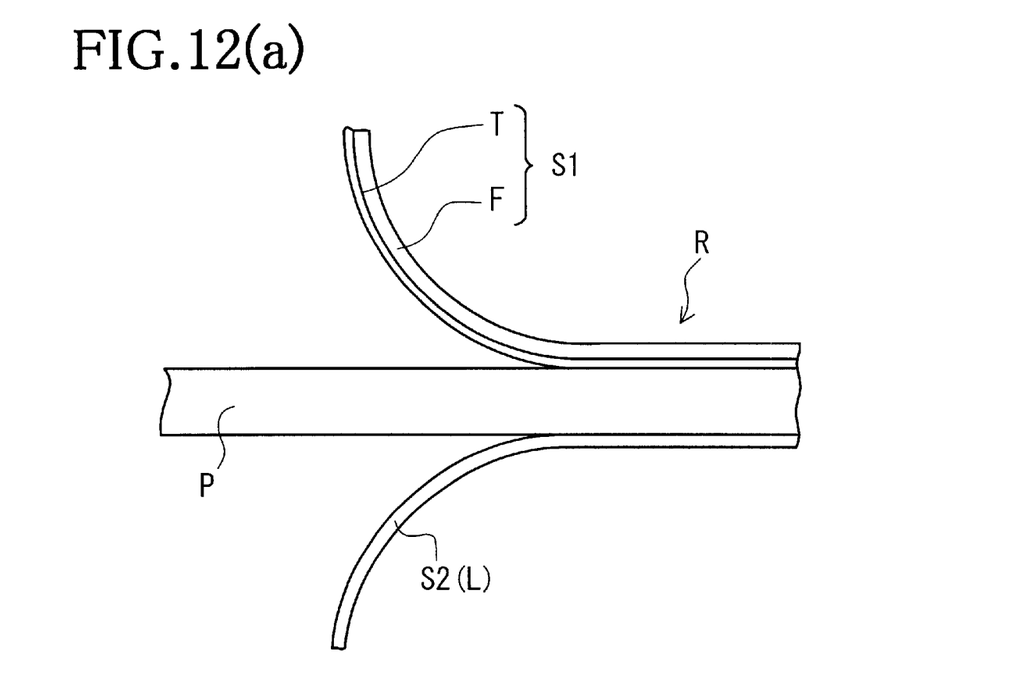
FIG. 12(a) is a diagram showing a layer structure of sheets laminated by the laminating apparatus of the invention.

The width of the sheets S1, S2 is larger than the width of the paper P, and thus the sheets S1, S2 are protruded from the paper P in the width direction of the paper P. The adhesive layer T of the sheet S1 and the separation type sheet layer of the sheet S2 are adhesively attached to each other at the protruded portions, and the sheets S1, S2 and the paper P are substantially integrated into the laminate R. Thereafter, the laminate R is fed out to the cutting unit D as shown in FIG. 12(a).

In the laminating apparatus 1 of the embodiment, the first cutting mechanism cuts the protruded extra edge portions of the sheet S1, S2 to obtain a proper edge width when the width of the sheets S1, S2 is excessively larger than the width of the paper P. Further, when the feed-out of the laminate R progresses and the laminate R reaches a predetermined position in the Y direction of the paper P, that is, at the time when a predetermined position of the laminate R reaches the cutting position of the lateral cutting mechanism, the laminate R is cut by the second cutting mechanism in the X direction.

In the laminate R thus formed, the transparent film layer F is laminated on the surface of the paper P, the separation type sheet layer L exists on the back surface of the paper P in a non-adhesion state, the edge of the paper P is surrounded by the sheets S1, S2 and the transparent film layer F and the separation type sheet layer L adhere to each other at the protruded portions thereof while they are easily peeled off from each other.

Figure 12B:
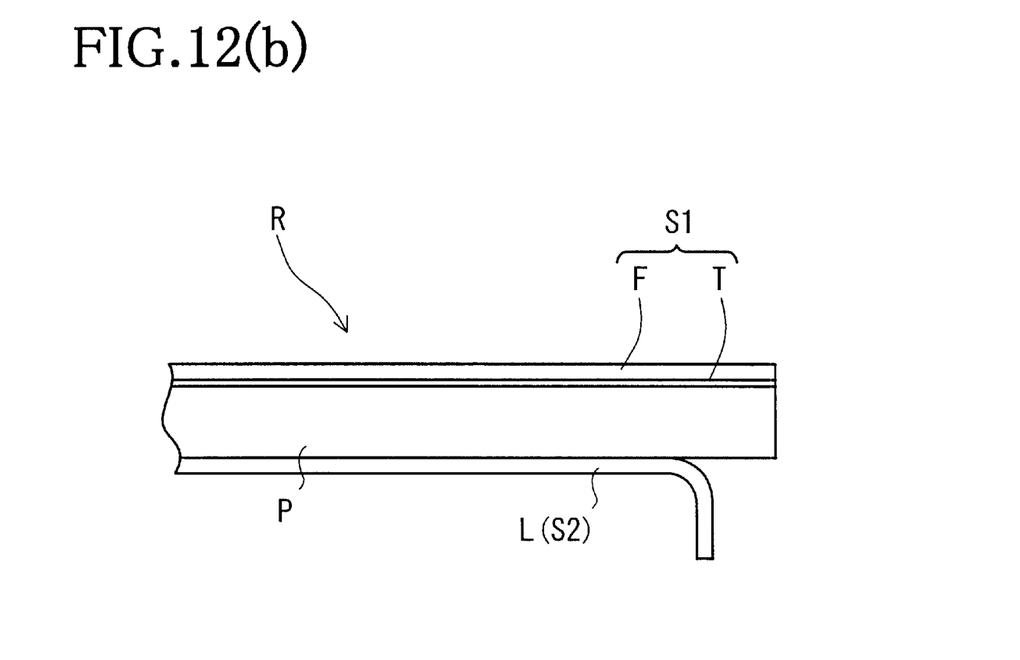
FIG. 12(b) is a diagram showing a method of using a laminate.

When the laminate R thus obtained is adhesively attached to the wall or the like, the separation type sheet layer L on the back surface of the laminate R is peeled off as shown in FIG. 12(b). As a result, the adhesive layer T of the sheet S1 is exposed to the surrounding portion of the paper P. Accordingly, the laminate R can adhere to a desk or the like.

Figure 13A:
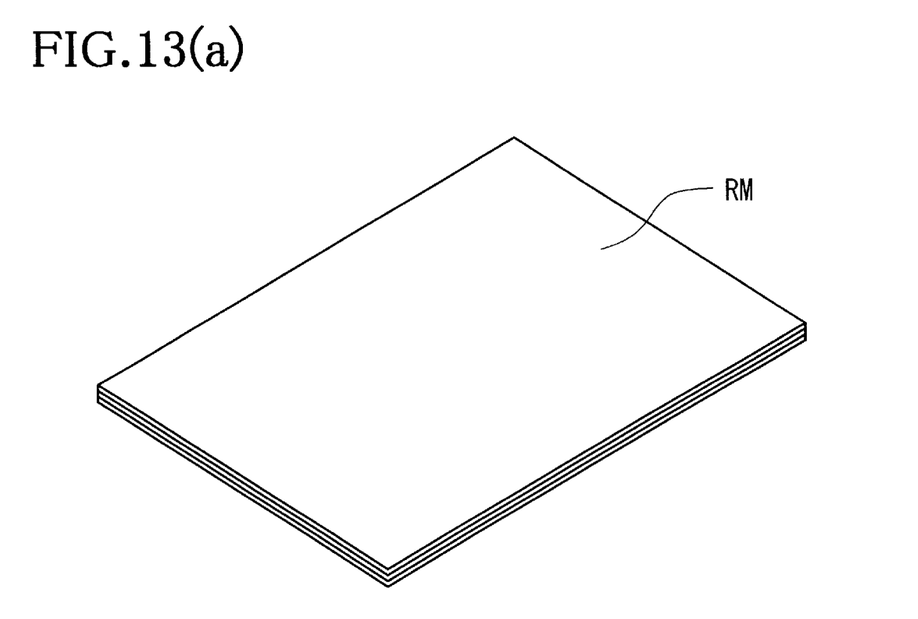
FIG. 13(a) is a perspective view of a laminate made by another embodiment.
Figure 13B:
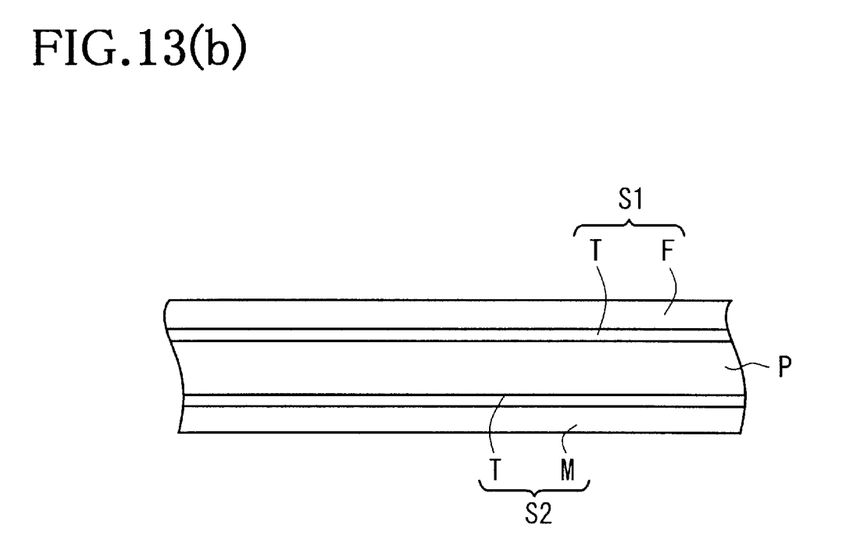
FIG. 13(b) is an enlarged view showing a layer structure of the laminate.

As another embodiment, the same sheet as the above embodiment (the laminate sheet of the resin film layer F and the adhesive layer T) is used as the sheet S1, and a magnetic sheet is used as the sheet S2. As an embodiment of the magnetic sheet, a sheet M having magnetism as a base and the adhesive layer T is laminated on one surface of the sheet M as shown in FIG. 13b. The sheet having magnetism may be formed by kneading magnetic material into rubber or synthetic resin to magnetize the sheet.

The laminate sheet S1 composed of the resin film layer F and the adhesive layer T and the magnetic sheet S2 are wound in a roll shape and accommodated in the housing 23 to fabricate a sheet cassette 20, and then the sheet cassette 20 thus fabricated is mounted in the sheet supply unit B. Subsequently, the same steps as described above are carried out to obtain a laminate RM having the layer structure as shown is FIGS. 13(a) and 13(b).

The surface of the laminate RM is protected by a transparent resin film layer F, and the magnetic layer M is laminated on the back surface of the laminate RM. Accordingly, the laminate RM can be magnetically attached to an iron plate or the like.

What is claimed is:

1. A laminating apparatus comprising;
    a laminate target supply unit that supplies a laminate target;
    a sheet cassette within a housing;
    a sheet supply unit within the sheet cassette that supplies a pair of sheets by which the laminate target is laminated; and
    a laminate processor that laminates the laminate target supplied from the laminate target supply unit with the sheets supplied from the sheet supply unit while the laminate target is sandwiched between the sheets and fed out as a laminated product,
    wherein a cassette accommodating portion for detachably accommodating a sheet cassette which accommodates the sheets wound in a roll shape thereof is formed in the sheet supply unit, and an adjustable paper feed roller means disposed between the laminate target supply unit and the cassette accommodating portion is provided so that the paper feed roller means can move closer to and apart from a laminate target leading side of the sheet cassette.

2. The laminating apparatus as claimed in claim 1, further comprising;
    a swing mechanism that moves the paper feed roller means closer to the laminate target leading side of the sheet cassette in synchronization with the placement of the sheet cassette into the cassette accommodating portion.

3. The laminating apparatus as claimed in claim 1, wherein a dimension of a feed direction of the laminate target in the cassette accommodating portion is formed to correspond to the sheet cassette in which sheets having a large winding diameter are accommodated, and the cassette accommodating portion is structured so that an attachment can be detachably mounted thereof and a sheet cassette in which sheets having a small winding diameter are accommodated is mounted apart from the laminate target supply unit on the attachment.

4. The laminating apparatus of claim 1, wherein the sheet cassette accommodates sheets having a large winding diameter mounted in the cassette accommodating portion of the laminating apparatus.

5. The laminating apparatus of claim 1, further comprising a depressed portion formed on the housing into which the paper feed rollers are adjustably disposed.

6. The laminating apparatus of claim 1, wherein the pair of sheets further comprise a first sheet having a transparent resin film layer and an adhesive layer, and a second sheet having a non-adhesive, separation type layer.

7. The laminating apparatus of claim 1, wherein the pair of sheets further comprise a first sheet having a transparent resin film layer and an adhesive layer, and a second sheet having a magnetic base layer and an adhesive layer.

8. The laminating apparatus of claim 1, wherein the sheet cassette housing size varies according to the paper size it accommodates and at least one size housing is placed directly upon the bottom of the cassette accommodation portion, whereas a lesser sized housing is placed upon an attachment within the cassette accommodation portion, the housing thereby aligning a paper feed path between the paper feed roller means and the pinch roller means.

9. A laminating apparatus comprising:
    a laminate target;
    a pair of adjustable laminate target feed rollers;
    a laminate target path passing through the feed rollers, a sheet feed cassette housing and a pair of pinch rollers;
    a sheet cassette housing having a first sheet roll providing a first sheet and a second sheet roll providing a second sheet;
    a cassette accommodation portion;
    the pair of pinch rollers located downstream of the first and second sheet rolls between which pinch rollers the laminate target continues through the laminate target path for laminating the laminate target between the first and second sheets; and
    a cutter.

10. The laminating apparatus of claim 9, wherein the sheet cassette housing further comprises a depressed portion for receiving the adjustable laminate target feed rollers for aligning the laminate target feed path with the downstream housing and pinch rollers according to the housing size.

11. The laminating apparatus of claim 10, wherein the housing size varies according to the sheet size it accommodates and wherein at least one size housing is placed directly upon the bottom of the cassette accommodation portion, whereas a lesser sized housing is placed upon an attachment within the cassette accommodation portion thereby aligning the laminate target path between the laminate target feed rollers and the downstream housing and pinch rollers.

12. The laminating apparatus of claim 11, further comprising a swing arm synchronizingly movable with the placement of the sheet cassette housing into the cassette accommodation portion for urging the laminate target feed rollers into or out of the depression portion of the housing.

13. The laminating apparatus of claim 12, wherein the first sheet comprises a transparent resin film layer and an adhesive layer, and the second sheet comprises a non-adhesive separation layer.

14. The laminating apparatus of claim 12, wherein the first sheet comprises a transparent resin film and an adhesive layer, and the second sheet comprises a magnetic layer and adhesive layer.

* * * * *